No. 726,655. PATENTED APR. 28, 1903.
J. DREISER.
FISHING REEL.
APPLICATION FILED DEC. 3, 1902.
NO MODEL. 2 SHEETS—SHEET 1.
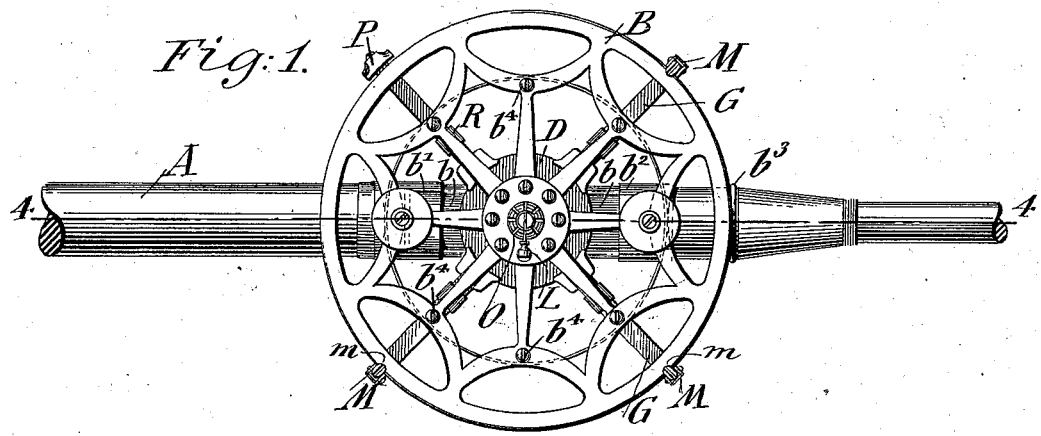
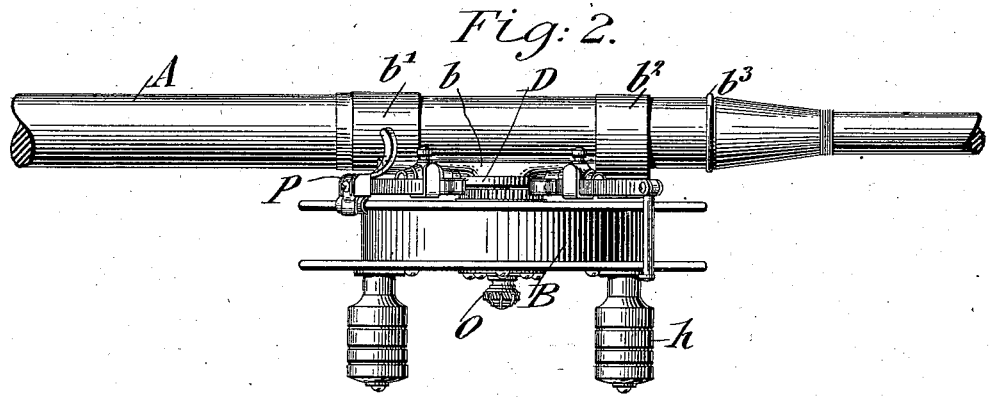
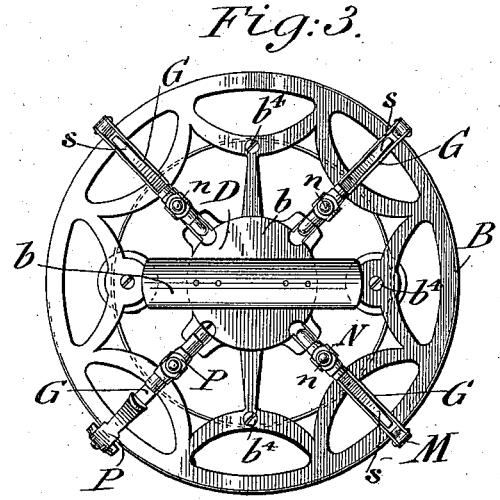

No. 726,655. PATENTED APR. 28, 1903.
J. DREISER.
FISHING REEL.
APPLICATION FILED DEC. 3, 1902.
NO MODEL. 2 SHEETS—SHEET 2.
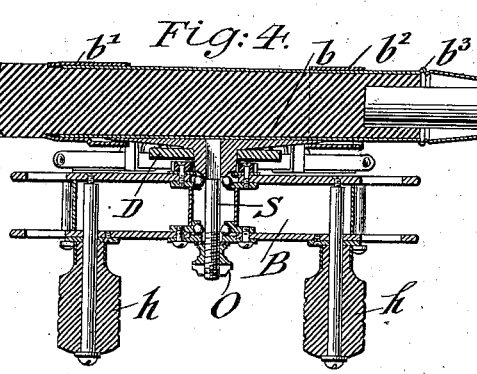
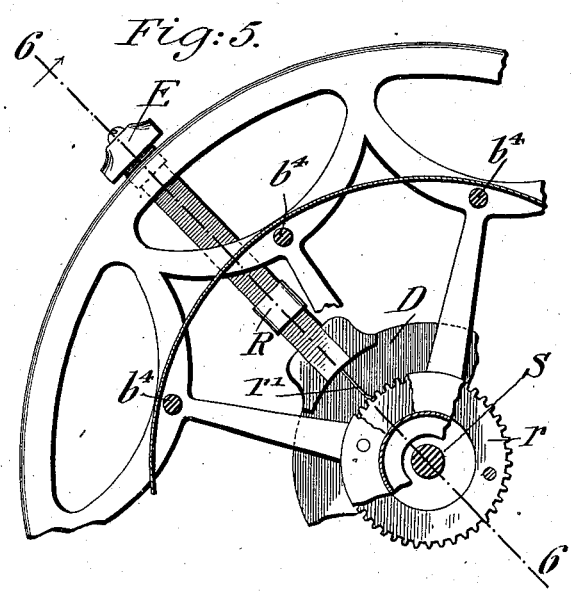
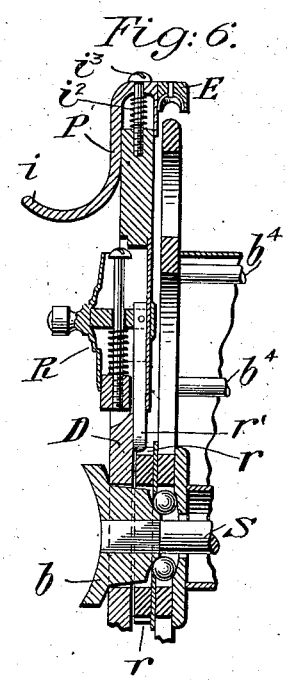
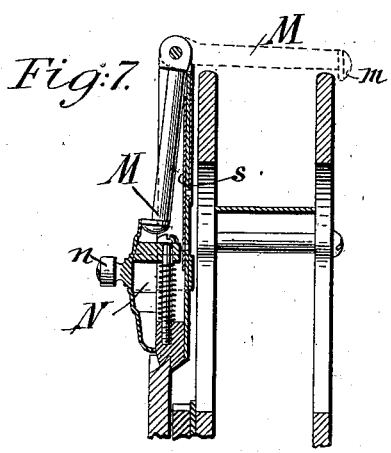
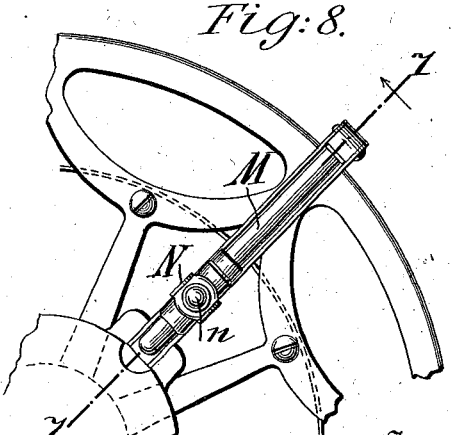

UNITED STATES PATENT OFFICE.

JOHN DREISER, OF NEW YORK, N. Y.

FISHING-REEL.

SPECIFICATION forming part of Letters Patent No. 726,655, dated April 28, 1903.

Application filed December 3, 1902. Serial No. 133,691. (No model.)

*To all whom it may concern:*

Be it known that I, JOHN DREISER, a citizen of the United States, residing in New York, borough of Manhattan, and State of New York, have invented certain new and useful Improvements in Fishing-Reels, of which the following is a specification.

This invention relates to certain improvements in fishing-reels by which not only the line can be retained on the reel without slipping off the same during the process of unwinding the same, but also the reel can be instantly stopped when it is desired to arrest the unwinding motion of the line or its motion be retarded as required, and in which the reel can be clamped rigidly in position on the rod, so as to prevent the turning of the same when the rod is temporarily left in the ground for permitting the fisherman to attend to other matters; and for this purpose the invention consists of a fishing-reel which is composed of two spider-frames, a circular portion for winding up the line, and screw-posts connecting the spider-frames.

The invention consists, secondly, of spring-actuated fingers that are retained by a suitable latch mechanism alongside of the reel and adapted to extend across the circumference of the same, so as to retain the line when the same is paid out.

The invention consists, thirdly, of a brake device for the reel by which the motion of the same can be retarded or stopped.

The invention consists, fourthly, of a clamping device for locking the reel to its shaft when the line is not desired to be paid out; and the invention consists, lastly, of certain details of construction, which will be fully described hereinafter and finally pointed out in the claims.

In the accompanying drawings, Figure 1 represents a side elevation of my improved fishing-reel, showing it attached to a fishing rod or pole. Fig. 2 is a plan view of Fig. 1. Fig. 3 is a rear elevation of the fishing-reel shown as detached from the rod. Fig. 4 is a horizontal section on line 4 4, Fig. 1. Fig. 5 is a sectional side elevation of the reel with parts broken away, showing a detail view of an arm of the reel provided with a brake device. Fig. 6 is a sectional transverse section on line 6 6, Fig. 5, and showing the brake device and spring-actuated click device in detail; and Figs. 7 and 8 are respectively a vertical transverse section of the reel and a detail side elevation of a portion of the same, showing in detail the line-retaining finger of the same.

Similar letters of reference indicate corresponding parts.

Referring to the drawings, A represents the stock of a fishing-rod, and B a fishing-reel, which is detachably connected with the stock A by means of a concaved plate $b$, that is inserted between longitudinal ribs in the metallic covering of the stock, one end of the concaved plate being inserted in a stationary socket $b'$ on the stock, while the other end is retained by the sliding socket $b^2$, that is moved downward over the plate so as to firmly clamp the same to the metallic shell of the stock, as shown, respectively, in Figs. 1 and 4. By sliding the movable sleeve in upward direction until it is arrested by an annular shoulder $b^3$ the entire reel can be detached from the stock and readily carried in the basket, while the pieces composing the rod are taken apart and carried in the usual cover.

The reel is for the sake of lightness made of aluminium, and consists of two spider-frames between which is placed a concentric band of aluminium of less diameter than the outer diameter of the side frames, said side frames and band being firmly held in position by means of transverse bolts $b^4$, the heads of which are countersunk, while the opposite ends are attached by means of smaller metallic screws against the opposite ends of the fastening-bolts. The reel is provided at diametrically opposite points with handles $h$, which are applied loosely to extended connecting-posts that are attached to the reel by screws or otherwise and which turn between suitable washers on said bolts. The hub of the side frames of the reel is supported by suitable ball-bearings on the center shaft or spindle S of the same, said spindle being inserted by a square end into a socket that is formed integral with the concave fastening-plate $b$. The raceways of the ball-bearings are formed of a flanged body which is attached to the hubs of the side frames and which surrounds the center spindle of the reel, suitable ring-shaped faceplates being arranged outside and attached by screws to the exterior flanges of the intermediate cylinder, as shown clearly in Figs. 1 and 4. One set of antifriction-balls runs in the raceways between the outer side frame and the interior flange of the cylinder-body, and the second set of antifriction-balls runs at the interior flange of the cylinder-body and the raceways of the spindle-socket. By means of the antifriction-bearings the reel runs with little friction on its spindle, so as to pay off as well as wind up the line with facility on the circular inner portion of the reel.

When the fisherman has to attend to other matters, the rod is usually held to the ground by heavy stones, while the hook remains in the water. In such a case the reel is rigidly clamped or locked in position, so as to prevent the paying off of the line. This is accomplished by a screw-nut O, that is placed on the outer threaded end of the spindle, said screw-nut being provided with radial recesses in its circumference and adapted to be screwed on the reel or away from the same. When it is screwed tightly against the reel, so as to hold the same clamped in position, the locking-latch L, which is pivoted at its inner end in the end of the spindle and provided with a button at its outer end, is placed into one of the recesses of the clamping-nut, so as to prevent the accidental release and shifting of the clamping-nut. This clamping mechanism is clearly shown in Figs. 1 and 4 and forms a convenient device for fishermen whenever it is desired to use the same. Ordinarily, however, the clamping-screw is turned in position so as not to interfere with the motion of the reel, the line being placed in one of the recesses of the clamping-nut, so as to hold it in position and prevent its playing loose on the spindle, so as to become detached therefrom.

To the spindle-socket is attached a circular ring or disk D, which is provided at four or more points of its circumference with radial arms G, that extend to the outer circumference of the reel. These arms are provided at the outer circumference of the reel with pivoted arms M, which are slightly longer than the width of the reel, said rods being provided with a projection $m$ at their outer ends. At the inner end of each radial finger-supporting arm is arranged a sliding and spring-actuated socket N, that is guided on the arm and adapted to lock the pivoted finger when the same is moved into the hollow outer end of the radial arm. The sliding and spring-actuated socket is provided with a handle $n$, so that it can be pushed in backward direction against the tension of the spring for releasing the pivoted arm and permitting it to be moved transversely across the reel. A flat spring $s$ is inserted into the hollow or U-shaped portion of the arm, said spring acting on the arm so as to propel it outward from the U-shaped portion, whereby the fisherman is enabled to easily take hold of and move it transversely across the reel. When the arm is in transverse position across the reel, it serves for retaining the line and preventing it from going outside of the reel and getting entangled with the same when the line is rapidly paid out by the pull of a fish under water. The transverse arms form thereby a safety device during the quick paying out of the line, while it also facilitates the winding and rewinding of the line on the reel without entangling the same. Ordinarily, however, when the fisherman does not require the retaining-fingers on the reel they are placed in position in the arms and locked by the spring-sockets.

When it is desired to quickly stop the reel when a sufficient length of line is paid off, or when the velocity of the same is desired to be retarded, a brake device P is operated, which is arranged in one of the radial arms in place of the retaining-finger, said brake device consisting of a spring-actuated brake-shoe E and handle $i$, the spring $i^2$ being placed on a screw $i^3$, set in the end of the arm, as shown in Fig. 6. The brake-shoe is preferably made U-shaped in cross-section, said shoe being of extended length and provided with a suitable antifriction-lining, preferably leather, so as to increase the friction when pressed on the circumference of the reel-frame.

To the inner end of the hub of the reel is applied a ratchet-wheel $r$, which is engaged by a click-spring $r'$, that is attached to a sliding and spring-actuated sleeve R, that is guided on the same arm to which the brake device is attached, as shown in Figs. 5 and 6. When the sleeve R, with the spring attached, is pressed inwardly, the spring $r'$ engages the ratchet-wheel $r$, and this produces an audible click when the reel is turned, so as to indicate to the angler that there is a tug at the line and draw his attention thereto. This click arrangement may be advantageously used in many other cases.

The improved fishing-reel combines many advantages, namely: first, the facility of attaching or detaching the reel to and from the stock of the rod; secondly, great lightness, notwithstanding its large size; thirdly, the facility for retaining the line, especially when the same is paid off at great velocity, and permitting the easy running and handling of the reel; fourthly, the arrangement of the brake device, and, lastly, the arrangement of the click by which the attention of the fisherman is called to the fact that a fish has taken the hook.

Having thus described my invention, I claim as new and desire to secure by Letters Patent—

1. The combination, with a concave plate of a fishing-reel provided with a spindle at right angles to the plate, of a disk attached to said concave plate and spindle, radial arms on said disk extending to the outer circumference of the reel, and pivoted and spring-actuated fingers at the outer ends of said radial arms and adapted to be moved transversely across the reel, substantially as set forth.

2. The combination, with a concave plate of a fishing-reel provided with a spindle at right angles thereto, of a disk attached to said concave plate and spindle, radial arms on said disk and extending to the outer circumference of the reel, and a brake device at the end of one of said arms for retarding the motion of the reel, substantially as set forth.

3. The combination, with a concave plate of a fishing-reel provided with a spindle at right angles thereto, of a disk attached to said concave plate and spindle, radial arms on said disk and extending to the outer circumference of the reel, spring-actuated fingers pivoted to the outer ends of said arms and adapted to be placed transversely across the surface of the reel, and a locking device for holding the free ends of the fingers when not required for use, substantially as set forth.

4. The combination, with a concave plate of a fishing-reel, provided with a spindle at right angles thereto, of a disk attached to said concave plate and spindle, radial arms on said disk extending to the outer surface of the reel, spring-actuated fingers pivoted at the outer ends of said arms and adapted to be placed transversely across the circumference of the reel, and a spring-actuated locking device for holding the free ends of the fingers when not required for use, substantially as set forth.

5. In a fishing-reel, the combination, with the concave plate of a fishing-reel provided with a spindle at right angles thereto, of radial arms attached to said plate and hollow at their outer ends, fingers pivoted at the other ends of said arms and adapted to be placed transversely across the reel when moved in one direction and in the hollow arms, when moved in the other direction, and a locking device for retaining the fingers in said hollow radial arms when not required for use, substantially as set forth.

6. In a fishing-reel, the combination, with the concave plate of a fishing-reel provided with a spindle at right angles thereto, of a disk attached to said concave plate and spindle, radial arms on said disk and hollow at their outer ends, fingers pivoted at the outer ends of said arms and adapted to be placed transversely across the circumference of the reel when moved in one direction, and in the hollow outer ends of the arms, when moved in the other direction, a spring in the hollow arms for moving the fingers outwardly from the same previous to moving them across the reel, and a spring-actuated locking device for retaining the fingers in said radial arms when not required for use, substantially as set forth.

7. In a fishing-reel, the combination, of radial arms supported on the spindle of the reel, a sliding and spring-actuated brake guided at the outer end of one of said arms, and provided with a brake-shoe for engaging the circumference of the reel when a brake action is applied thereto, substantially as set forth.

8. In a fishing-reel, the combination, of hollow radial arms, spring-actuated fingers pivoted to the outer ends of said arms and adapted to be moved transversely across the circumference of the reel-frame in one direction and in the hollow arm when moved in the other direction, a spring-actuated locking device for retaining the fingers in said radial arms when not required for use, and a sliding and spring-actuated brake guided on the outer end of one of said arms, provided with a brake-shoe for engaging the reel when a brake action is applied thereto, substantially as set forth.

9. The combination, of a concave plate of a fishing-reel, a spindle at right angles to said concave plate and threaded at its outer end, a clamping-nut provided with a plurality of radial recesses, and a locking-latch pivoted at the central part of the outer end of the spindle and adapted to engage one or the other of the diametrically opposite recesses of the clamping-nut, so as to clamp the reel when the locking-latch is moved in either one or the other direction, substantially as set forth.

In testimony that I claim the foregoing as my invention I have signed my name in presence of two subscribing witnesses.

JOHN DREISER.

Witnesses:
 PAUL GOEPEL,
 HENRY J. SUHRBIER.